United States Patent Office 2,767,092

Patented Oct. 16, 1956

2,767,092

LIGHT SENSITIVE MATERIAL FOR LITHOGRAPHIC PRINTING

Maximilian Paul Schmidt, Wiesbaden-Biebrich, Germany, assignor, by mesne assignments, to Azoplate Corporation, Summit, N. J., a corporation of New Jersey

No Drawing. Application December 3, 1952, Serial No. 323,934

Claims priority, application Germany December 6, 1951

26 Claims. (Cl. 95—7)

The present invention relates to the production of light-sensitive material suitable for use in the graphic art. More particularly it relates to a photomechanical method for the manufacture of printing plates and to light-sensitive material suitable for use in the said method.

In the copending U. S. patent application Serial No. 174,556, filed on July 18, 1950 by Maximilian Paul Schmidt a process is described for the production of images, in particular of printing plates, by the means of diazo compounds, which calls for the following procedure: diazo compounds that have the constitution of esters or amides of the sulfo acids or carboxylic acids of 2-diazo-naphthol-(1) or of 1-diazo-naphthol-(2)-(another designation of said diazo-naphthols being naphthoquinone-1,2-diazides) are used to produce a light-sensitive layer on a base material; this layer is then exposed to light through a master, and the image thus obtained is developed with alkali and then heated. As is pointed out in said patent application the process may be modified by admixture of alkali-soluble resins or fatty acids with the diazo compounds and by omission of the heating subsequent to the development of the image.

It has now been found that the esters of quinone-(1,2)-diazide-sulfo acids and cyclic alcohols, such as, for example, cyclohexanol or higher molecular cyclic alcohols are also excellently suited for the production of images which may then be used in particular as stereotypes or printing plates. Said esters of quinone-(1,2)-diazide sulfo acids and cyclic alcohols are as well suited for the production of light-sensitive layers as are the aryl esters of the quinone-(1,2)-diazide-sulfo acids. Small quantities of alkali-soluble resins or suitable dyes may be incorporated into the layers, as described in the above referred to pending patent applications, whereby an improvement of the layers can be achieved in some cases. It is possible also to employ mixtures of several quinone-(1,2)-diazide-sulfo-acid esters of cyclic alcohols or mixtures of such esters with the aryl esters or aryl amides of quinone-(1,2)-diazide-sulfo acids. The use of such mixtures often leads to more uniform layers or to improved ink-receptivity of the particles of the image. Suitable base materials for the light-sensitive layers are primarily metal foils and metal plates, in particular aluminum and zinc foils as well as plates consisting of these metals.

The production of the images for use as printing plates can be carried out in the same manner as described in the above cited copending patent application Serial Number 174,556.

The examples set forth below are included for the purpose of illustrating the present invention. Restriction of the invention to what has been disclosed in the examples is not intended.

1. A 1.5% solution of the naphthoquinone-(1,2)-diazide-(2)-5-sulfo-acid-cyclohexyl-ester having the formula

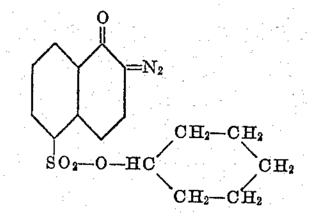

in glycol-monomethyl ether is applied as a thin layer to a mechanically roughened aluminum foil, and this layer is thoroughly dried, initially in a hot-air current and then by briefly heating to a temperature of approximately 90° C. The dried layer is then exposed to light under a positive master pattern and subsequently developed with a 5% solution of soda. There is obtained on the aluminum foil a yellow-colored diazo image, which can be inked with greasy ink after the image-covered surface of the foil has been wiped over briefly with a 1% solution of phosphoric acid. The foil is then rinsed with water, and a distinct positive image is obtained, which can serve as a stereotype or can be used for printing. Rosin in an amount of, for example, approximately 30% may be mixed with the light sensitive layer. When a superficialy oxidized aluminum plate is used as the base material and treated according to the procedure just explained, a similar image is obtained.

The naphthoquinone - (1,2)-diazide - (2)-5-sulfo-acid-cyclohexyl ester is obtained in the following manner:

2 parts by weight of cyclohexanol are mixed with 20 parts by volume of pyridine. 5.4 parts by weight of naphthoquinone - (1,2) - diazide-(2)-5 - sulfochloride are slowly added to this mixture at room temperature. Only a slight increase in temperature takes place. When the reaction has finished, the resulting solution is briefly heated to a temperature of 35° C. and is then left standing for 24 hours at room temperature. Thereupon the solution is poured into 150 parts by volume of cold diluted hydrochloric acid. A yellow, initially smeary product precipitates, which congeals after some time. It is filtered, washed with water, and recrystallized from alcohol. The reddish-yellow crystals of the cyclohexyl ester of naphthoquinone-(1,2)-diazide-(2)-5-sulfo acid thus obtained readily dissolves in benzene but more difficultly in alcohol and decomposes at a temperature of approximately 124° C.

2. 0.9 parts by weight of naphthoquinone-(1,2)-diazide-(2)-5-sulfo-acid-cyclohexyl ester and 0.6 parts by weight of naphthoquinone-(1,2)-diazide-(2)-4-sulfo-acid-menthyl ester having the formula

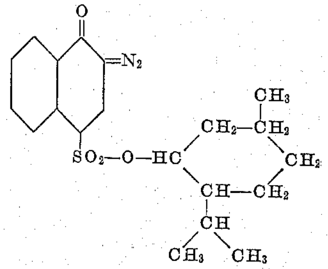

are dissolved in 100 parts by volume of glycol-monomethyl ether. This solution is applied to a mechanically roughened aluminum foil by means of a plate whirler. The layer is dried thoroughly, then exposed to light behind a positive master pattern, and finally rubbed in thinly with greasy ink. The foil is then dusted with talcum in the customary manner, and the image is developed with a 10% solution of disodium phosphate by wiping over the dusted layer with a cotton pad saturated with the phosphate solution. A deeply colored image is thus obtained, which can be used for printing subsequent to its being inked with greasy printing ink.

Naphthoquinone - (1,2) - diazide - (2) - 4 - sulfo-acid-menthyl-ester may be produced according to the following procedure:

1.5 parts by weight of menthol and 6 parts by weight of naphthoquinone - (1,2)-diazide - (2) - 4 - sulfochloride are introduced into 10 parts by volume of pyridine at room temperature. After a few hours, the mixture congeals to form a thick crystalline mass, which is left standing for 24 hours and is then mixed with 25 parts by volume of a 60% aqueous alcohol. The separated menthyl ester of the naphthoquinone-(1,2)-diazide-(2)-4-sulfo acid is filtered and washed with a 60% aqueous alcohol and subsequently with water. Recrystallized from aqueous dioxane the menthyl ester forms bright yellow crystals, which start to sinter at approximately 160° C. and then slowly decompose with a further rise in temperature. The menthyl ester very easily dissolves in benzene, but is very hard to dissolve in gasoline.

The cyclohexyl ester of the naphthoquinone-(2,1)-diazide-(2)-4-sulfo acid is obtained analogously. When recrystallized from benzene, it sinters at a temperature of approximately 160° C. and slowly decomposes at 170° C. It dissolves easily in dioxane, is insoluble in gasoline, and can be used in the same manner as the menthyl ester.

3. 1,5 parts by weight of the bis-naphthoquinone-(1,2)-diazide-(2)-5-sulfonic acid ester of β,β-bis-(p-hydroxy-cyclohexyl)-propane having the formula

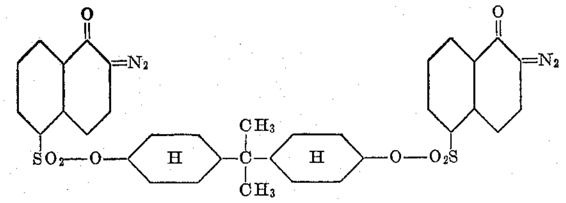

are dissolved in 100 parts by volume of monomethylglycol ether. In the usual way, the solution is coated onto a mechanically roughened aluminum foil and upon thorough drying, the formed thin layer is exposed to light under a diapositive. By developing the exposed layer with a 3% solution of trisodium phosphate, removing thereby the areas struck by light, a yellow positive diazo image is obtained suitable for etching and inking with greasy ink. Prints can be made from the diazo image in the usual way.

The compound of the formula 3 can be obtained in the following way: 2,4 parts by weight of β,β-bis-(p-hydroxy-cyclohexyl)-propane are mixed with 5,9 parts by weight of naphthoquinone-(1,2)-diazide-(2)-5-sulfochloride. After addition of 6 parts by volume of dry pyridine, the mixture is heated on the water bath until all components are dissolved. The temperature is not allowed to exceed 50° to 60° C. Upon mixing the solution thoroughly, it is cooled off and, for 24 hours the reaction mixture remains standing in a refrigerator, protected from humidity. The solidified reaction mixture is diluted with pyridine and led into 250 parts by volume of cold water. The separated product is filtered, washed out with cold water and dried. The decomposition point of the substance is 85° C.

I may also use the above described esters wherein the sulfo-acid-ester radical is positioned in the 3, 6, 7, or 8 positions of the naphthoquinone-diazide radical.

I claim:

1. As a new article, a positive working light sensitive material comprising a base and a light sensitive layer coated on said base, said light sensitive layer comprising the water insoluble compound, a naphtho-quinone-(1,2)-diazide-sulfo-acid ester of a cyclohexyl alcohol.

2. As a new article, a positive working light sensitive material comprising a base and a light sensitive layer coated on said base, said light sensitive layer comprising a water insoluble diazo composition containing a mixture of naphtho-quinone-(1,2)-diazide-sulfo-acid esters of cyclohexyl alcohols.

3. As a new article, a positive working light sensitive material comprising a base and a light sensitive layer coated on said base, said light sensitive layer comprising a naphthoquinone-(1,2)-diazide-(2)-sulfo-acid ester of a cyclohexyl alcohol.

4. As a new article, a positive working light sensitive material comprising a base and a light sensitive layer coated on said base, said light sensitive layer comprising naphthoquinone-(1,2)-diazide-(2)-5-sulfo-acid cyclohexyl ester.

5. As a new article, a positive working light sensitive material comprising a base and a light sensitive layer coated on said base, said light sensitive layer comprising naphthoquinone - (1,2) - diazide - (2) - 4 - sulfo-acid menthyl ester.

6. As a new article, a positive working light sensitive material comprising a base and a light sensitive layer coated on said base, said light sensitive layer comprising a mixture of a naphthoquinone-(1,2)-diazide-(2)-sulfo-acid ester of a cyclic alcohol and naphthoquinone-(1,2)-diazide-(2)-4-sulfo-acid menthyl ester.

7. As a new article, a positive working light sensitive material comprising a base and a light sensitive layer coated thereon, said light sensitive layer comprising a mixture of naphthoquinone-(1,2)-diazide-(2)-4-sulfo-acid menthyl ester and naphthoquinone-(1,2)-diazide-(2)-5-sulfo-acid cyclohexyl ester.

8. As a new article of manufacture, a positive working light sensitive material comprising a base and a light sensitive layer coated on said base, said light sensitive layer comprising the bis-naphthoquinone-(1,2)-diazide-(2)-5-sulfo-acid ester of β,β-bis (p-hydroxy-cyclohexyl)-propane.

9. As a new article of manufacture, a positive working light sensitive material comprising a base and a light sensitive layer coated on said base, said light sensitive layer comprising a mixture of a naphtho-quinone-(1,2)-diazide-sulfo-acid ester of a cyclohexyl alcohol and a substance for increasing the ink receptivity of the image selected from the group consisting of resins and fatty acids.

10. The positive working process for forming lithographic printing plates comprising the steps of coating a base with a light sensitive layer comprising a water insoluble diazo compound containing a naphthoquinone-(1,2)-diazide-sulfo-acid ester of a cyclohexyl alcohol, exposing said light sensitive layer to a light image to decompose said diazo compound in the light struck areas and treating the exposed layer with an alkaline solution to remove the decomposed diazo compound.

11. The positive working process for forming lithographic printing plates comprising the steps of coating a base with a light sensitive layer comprising a mixture of naphtho-quinone-(1,2)-diazide-sulfo-acid esters of cyclohexyl alcohols, exposing said light sensitive layer to a light image to decompose said diazo compounds in the light struck areas and treating the exposed layer with an alkaline solution to remove the decomposed diazo compounds.

12. The positive working process for forming lithographic printing plates comprising the steps of coating a base with a light sensitive layer comprising naphthoquinone-(1,2)-diazide-(2)-5-sulfo-acid cyclohexyl ester, exposing said light sensitive layer to a light image to decompose said diazo compound in the light struck areas and treating the exposed layer with an alkaline solution to remove the decomposed diazo compound.

13. The positive working process for forming lithographic printing plates comprising the steps of coating a base with a light sensitive layer comprising the bis-naphthoquinone-(1,2)-diazide-(2)-5-sulfo-acid ester of $\beta,\beta$-bis-(p-hydroxy-cyclohexyl)-propane, exposing said light sensitive layer to a light image to decompose said diazo compound in the light struck areas and treating the exposed layer with an alkaline solution to remove the decomposed diazo compound.

14. Ester of a naphthoquinone-(1,2)-diazide-(2)-sulfo-acid and a saturated cyclohexyl alcohol.

15. Naphthoquinone-(1,2)-diazide-(2)-5-sulfo-acid cyclohexyl ester.

16. Naphthoquinone-(1,2)-diazide-(2) - 4 - sulfo - acid menthyl ester.

17. Bis-naphthoquinone-(1,2)-diazide-(2)-5-sulfo - acid ester of $\beta,\beta$-bis-(p-hydroxy-cyclohexyl)-propane.

18. As a new article of manufacture, a positive working light sensitive material comprising a base and a light sensitive layer coated on said base, said layer includng a naphthoquinone-(1,2)-diazide-(2)-sulfo-acid ester of a cyclohexyl alcohol and a substance for increasing the ink receptivity of the image selected from the group consisting of resins and fatty acids.

19. As a new article of manufacture, a positive working light sensitive material comprising a base and a light sensitive layer coated on said base, said layer comprising a mixture of naphthoquinone-(1,2)-diazide-(2)-5-sulfo-acid cyclohexyl ester and a substance for increasing the ink receptivity of the image selected from the group consisting of resins and fatty acids.

20. As a new article, a positive working light sensitive material comprising a base and a light sensitive layer coated on said base, said light sensitive layer comprising a mixture of naphthoquinone-(1,2)-diazide-(2)-5-sulfo-acid cyclohexyl ester and naphthoquinone-(1,2)-diazide-(2)-4-sulfo-acid-menthyl ester.

21. As a new article of manufacture, a positive working light sensitive material comprising a base and a light sensitive layer coated on said base, said layer comprising naphthoquinone-(1,2)-diazide-(2)-4-sulfo acid cyclohexyl ester.

22. As a new article, a positive working light sensitive material comprising a base and a light sensitive layer coated on said base, said light sensitive layer comprising a mixture of naphthoquinone-(1,2)-diazide-(2)-5-sulfo-acid-cyclohexyl ester and naphthoquinone-(1,2)-diazide-(2)-4-sulfo acid cyclohexyl ester.

23. The positive working process for forming lithographic printing plates comprising the steps of coating a base with a light sensitive layer including a water insoluble diazo compound containing naphthoquinone-(1,2)-diazide-(2)-4-sulfo-acid menthyl ester, exposing said light sensitive layer to a light image to decompose said diazo compound in the light struck areas and treating the exposed layer with an alkaline solution to remove the decomposed diazo compound.

24. The positive working process for forming lithographic printing plates including the steps of coating a base with a light sensitive layer containing a mixture of naphthoquinone-(1,2)-diazide-(2)-5-sulfo-acid-cyclohexyl ester and naphthoquinone-(1,2)-diazide-(2)-4-sulfo-acid-menthyl ester, exposing said light sensitive layer to a light image to decompose said diazo compound in the light struck areas and treating the exposed layer with an alkaline solution to remove the decomposed diazo compound.

25. The positive working process for forming lithographic printing plates including the steps of coating a base with a light sensitive layer containing naphthoquinone-(1,2)-diazide-(2)-4-sulfo acid cyclohexyl ester, exposing said light sensitive layer to a light image to decompose said diazo compound in the light struck areas and treating the exposed layer with an alkaline solution to remove the decomposed diazo compound.

26. The positive working process for forming lithographic printing plates including the steps of coating a base with a light sensitive layer containing a mixture of naphthoquinone-(1,2)-diazide-(2)-5 - sulfo - acid - cyclohexyl ester and naphthoquinone-(1,2)-diazide-(2)-4-sulfo acid cyclohexyl ester, exposing said light sensitive layer to a light image to decompose said diazo compound in the light struck areas and treating the exposed layer with an alkaline solution to remove the decomposed diazo compound.

References Cited in the file of this patent

FOREIGN PATENTS

| | | |
|---|---|---|
| 904,255 | France | Feb. 19, 1945 |
| 497,135 | Belgium | Aug. 14, 1950 |

OTHER REFERENCES

PB Report 17547–S3, released July 28, 1947 (10 pages in German).